May 23, 1944.    I. A. WEAVER ET AL    2,349,530
BALANCING-MACHINE INDICATOR
Filed April 22, 1942     3 Sheets-Sheet 1

INVENTORS.
Ira A. Weaver
Clyde H. Phelps
By Walter M. Fuller
atty.

May 23, 1944.  L. A. WEAVER ET AL  2,349,530
BALANCING-MACHINE INDICATOR
Filed April 22, 1942  3 Sheets-Sheet 2

INVENTORS
Ira A. Weaver
Clyde H. Phelps
By Walter M. Fuller
atty.

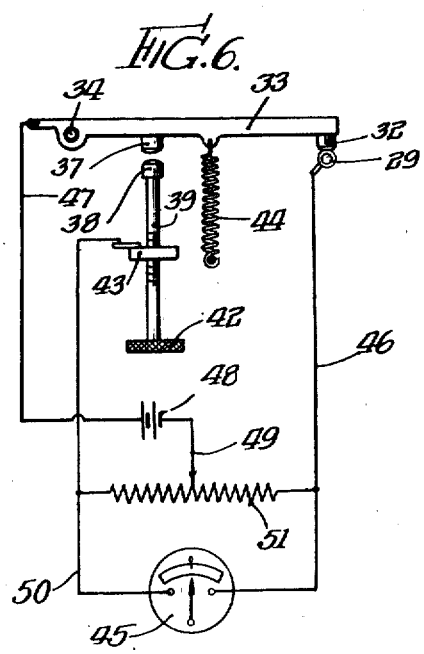
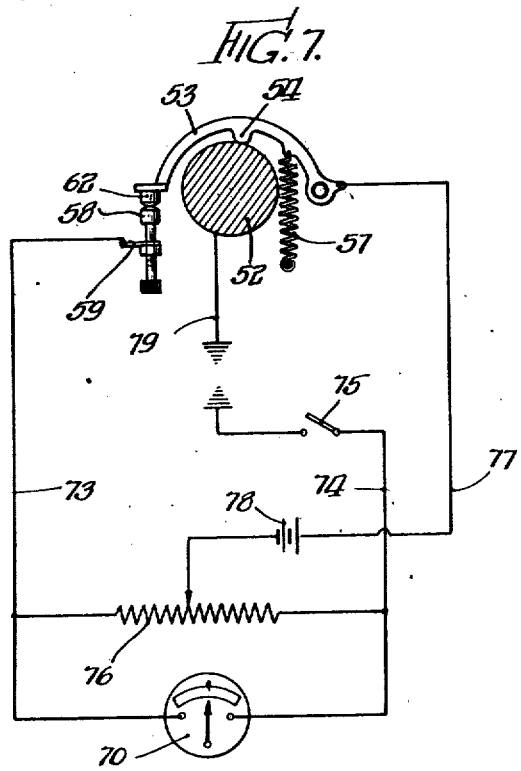
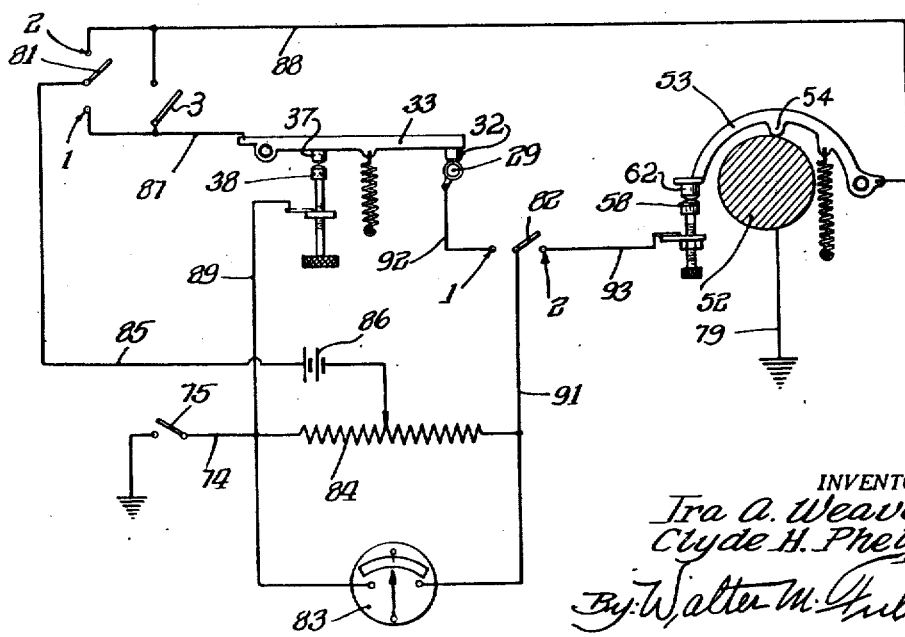

Patented May 23, 1944

2,349,530

UNITED STATES PATENT OFFICE.

2,349,530

BALANCING-MACHINE INDICATOR

Ira A. Weaver and Clyde H. Phelps, Springfield, Ill., assignors to Weaver Manufacturing Company, Springfield, Ill., a corporation of Illinois Application April 22, 1942, Serial No. 440,032

2 Claims. (Cl. 73—53)

The present invention pertains to means for indicating the center-point of the amplitude of vibration of a rotating, unbalanced member or body and the angular position of such body as it passes through such center-point, when the body is rotated in a suitable supporting structure wherein there is, to some degree, freedom for oscillation of such revolving member, at least in one transverse plane.

This invention has as one of its purposes the provision of novel means adapted to be attached to, or associated with, balancing-machines designed to test for, and to correct, unbalance existing in a rotatable member and whereby such means, incorporating the present invention, will denote the middle point of such vibration and the angular position of such rotating member when it traverses such halfway point.

The prior-art balancing-machines disclose many devices, some of which are adapted to subject the tested body to trial for, and to rectify, unbalance in two predetermined planes of correction, testing and correcting in each of the two planes by methods which involve mechanism designed to eliminate substantially the effect of unbalance on one such correction plane upon the other.

The means employing the current invention comprises a simple and exact mechanism to indicate the vibration and the exact center thereof, thereby supplying means for calibrating by test the precise value of the correctional weight required to balance out such vibration, as well as the angular position or point of application of such weight.

No means are provided by this invention for compensation or elimination of the effect of unbalance in one correction plane upon another, when a member is so mounted that this condition exists, but, the present invention will acturately indicate the vibration and the centerpoint or position thereof at the point of attachment of the appliance incorporating this invention to any balancing-machine where such conditions prevail, after which, by trial, calculation or additional correctional or compensating apparatus and through the indications of this invention, the proper weight value and its correct angular point of application may be determined.

The earlier art discloses methods and apparatus for ascertaining the "high point" or point of maximum displacement of vibration of a rotating body as indicative of the angular point of weight correction, but this "high point" will be at a new position for every different value of unbalance as well as for each change of speed of rotation.

Inasmuch, however, as the instant invention supplies means for indicating the exact center of vibration-amplitude or oscillation, this provides means, not affected by variation in speed of rotation or by value of unbalance, the midposition remaining constant while, as indicated, the maximum point is a variable one with speed and weight.

This novel invention, being electrical in nature and therefore capable of operating at high speeds, is such that members undergoing test may be desirably rotated at their normal operating speeds which may be considerably higher than the critical or resonant speed of the machine in which the test is being conducted.

To enable those skilled in this art to understand the current invention, present desirable embodiments thereof have been set forth in the several figures of the accompanying drawings, forming a part of this specification, and to which reference should be had in connection with the following detailed description.

In these drawings, in which for simplicity, like reference numerals have been used throughout the several views to designate the same parts—

Figure 6 illustrates the electrical-system incorporating the switch-mechanism shown in Figure 3;

Figure 5:
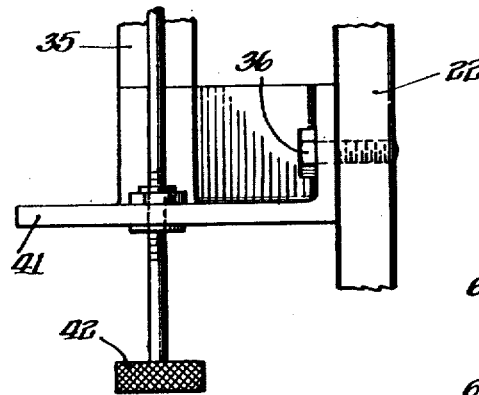
Figure 5 is a vertical section on line 5—5 of Figure 4.
Figure 5:
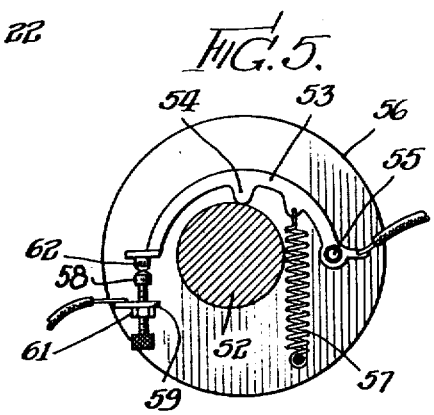
Figure 4:
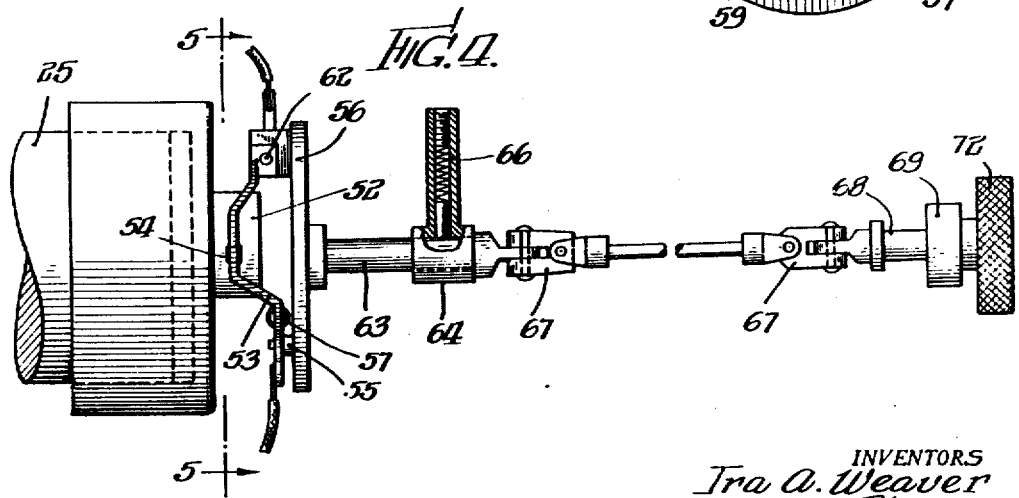
Figure 4 is an enlarged plan view of the cam contact structure shown on a smaller scale in Figure 1.

Figure 7 presents the electrical-system including the cam switch mechanism of Figures 4 and 5; and Figure 8 shows the complete electrical-system which includes both of the two switch-mechanisms.

The known or conventional balancing-machine with which the novel indicator system is shown associated includes a base 21 (Figures 1 and 2) from each end portion of which rises a pair of inwardly-overhanging standards or posts 22, 22 each of which has mounted thereon the upper end portion of a depending cable, link or the like 23, the lower end of which carries the corresponding part of a bearing-member 24 revolubly supporting the correlated terminal portion of the shaft 25 on which the body 26 to be tested is mounted in a manner to revolve with the shaft which is rotated by an electric-motor 27 on the base 21 and operatively connected to the shaft by a V-belt 28 cooperating with pulleys on the motor-shaft and on the shaft 25.

Obviously, if the rotating-body 26 is out of balance, it and the pair of aligned bearing-members 24, 24 will vibrate or oscillate horizontally transversely of the machine an amount dependent upon the degree of unbalance and upon the speed of rotation.

As to the novel and unique electrical-contact system of this invention for indicating the center or mid-point of the vibration, it includes a contact 29 (Figures 1, 2, 3, 6 and 8), insulated from, and upstanding from, the axis of and movable with, the bearing 31 of, one of the members 24 in which the shaft 25 revolves, and arranged to cooperate with a companion contact 32 on an electrically-conductive switch-arm 33 oscillatory about a pin 34 mounted on and insulated, in any approved manner (not shown), from a support 35 attached at 36 to one of the posts or standards 22.

Such conductive switch-arm 33 has another contact 37 designed and arranged to coact with an associated contact 38 on an adjustable screw 39 insulated from the support 35 and having threaded connection with an upright flange 41 of part 35 from which the screw is also insulated, in any suitable way (not illustrated), the screw at one end having a knurled knob 42 by which it may be turned to vary the position of its contact 38, the screw in addition being guided in its longitudinal adjustment by, and also in part supported by, a member 43 carried on but insulated from the element 35.

A coiled contractile spring 44 connected at one end to switch or breaker arm 33 is fastened at its opposite end to the member 35 by means of an insulation pin, such spring at all times tending to hold the contacts 32 and 29 in engagement and contacts 37 and 38 together.

When the rotating body 26 undergoing test vibrates horizontally by reason of its unbalance, it similarly vibrates shaft 25 and bearing 31 causing contact 29 to reciprocate back and forth and to oscillate arm 33 in comparable manner, part 29 maintaining engagement with contact 32, except insofar as bearing of the movable contact 37 on its companion, relatively-fixed screw-contact 38 precludes the travel of contact 31 further in one direction, thus providing a time dwell of the contacts in engagement with one another the length of which is determined by the adjusted position of such contact 38.

It will be obvious that, with arm 33 and its two bridged contacts 32 and 37 oscillating in this manner, the screw 39 and its contact 38 can be so adjusted that the latter remains entirely out of contact with contact 37 leaving contacts 29 and 32 closed the entire time regardless of the oscillation of the former.

By a reverse adjustment of contact 38, it can be brought to a point where the contacts 37 and 38 will remain closed continuously in spite of the vibration of contact 29.

It is therefore manifest that a point of adjustment may be found for screw 39 and its contact 38 such that a time dwell of 180° of rotation or oscillation with contacts 37 and 38 in engagement for an equal period results in this adjustment will cause a like length of time dwell of contacts 29 and 32 in engagement.

Assuming that such switch-mechanism has been connected in an electric-system as presented diagrammatically in Figure 6 with wire 50 connecting one terminal of a galvanometer 45, or other appropriate electrical instrument, to contact 38 through screw 39, wire 46 connecting the other terminal of the galvanometer to contact 29, wire 47 joining one electrode of an electric-battery or other source of electric-current 48 to the switch-arm 33, and wire 49 joining the other electrode of the battery to an intermediate point in a resistance 51 bridged across the galvanometer 45, it will be clear that. in such system, when switch 37—38 is closed, the electric-current will flow through the galvanometer in one direction tending to shift its needle in one direction, whereas, when switch 29—32 is closed, the electric-current will flow through the galvanometer in the opposite direction tending to move the needle also in such opposite direction.

Adjustment of screw 39 may be made such as to cause the needle of galvanometer 45 to provide a zero or null reading, this indicating equal, alternate time dwells or equal time periods of closure of the two switches 29—32 and 37—38 which occur in such rapid succession that the alternating forces on the galvanometer neutralize one another in effect.

It will be perceived that, under such conditions, all four contacts of the two switches are closed simultaneously for an instant only twice per revolution, once during the travel of part 29 in one direction and again during its travel in the opposite direction, these two points being 180° apart in the cycle of rotation.

Stated somewhat otherwise, it should be apparent that a point of adjustment of contact 38 may be readily found such that there will be a substantially-simultaneous, practically-instantaneous closure of one pair of contacts and a separation of the other pair of contacts caused by the vibration of the bearing-member supporting the shaft and the body undergoing examination.

When contact 38 has been thus adjusted during the rotation of the shaft and body, the zero reading of the galvanometer indicates that the center-point of vibration has been located, the axis of the body crossing such mid-point in one direction when the one switch closes and again crossing such mid-point, but in the opposite direction, when the other switch closes.

Although such center-point may be thus identified, other or supplementary means are required to locate such point angularly with relation to the axis of the rotary body and such means will now be dealt with.

Figure 1:
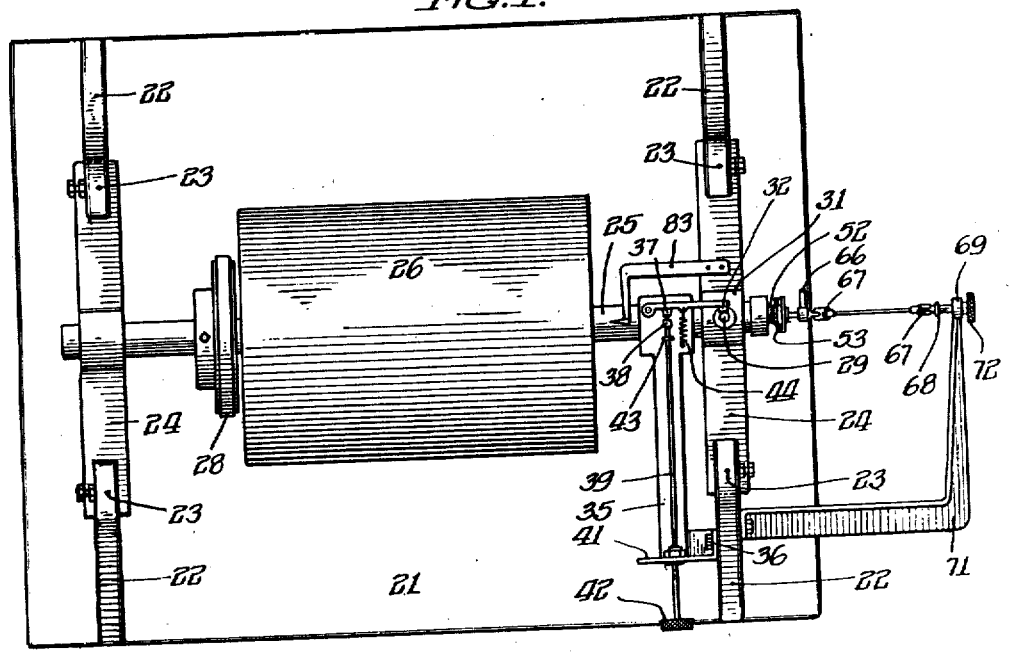
Figure 1 is a plan view of a balancing-machine equipped with the novel type of indicator incorporating the present invention.
Figure 2:
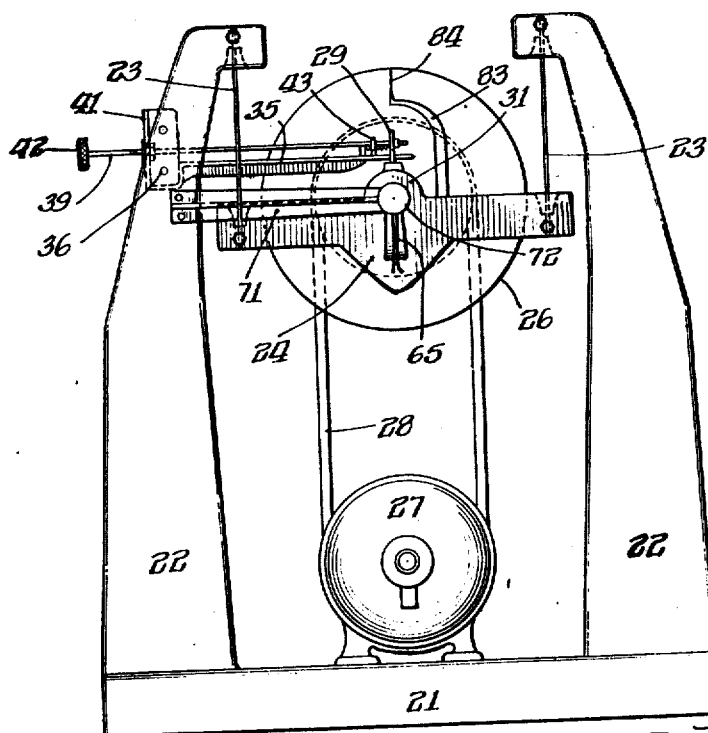
Figure 2 is an end view of the appliance shown in Figure 1.
Figure 3:
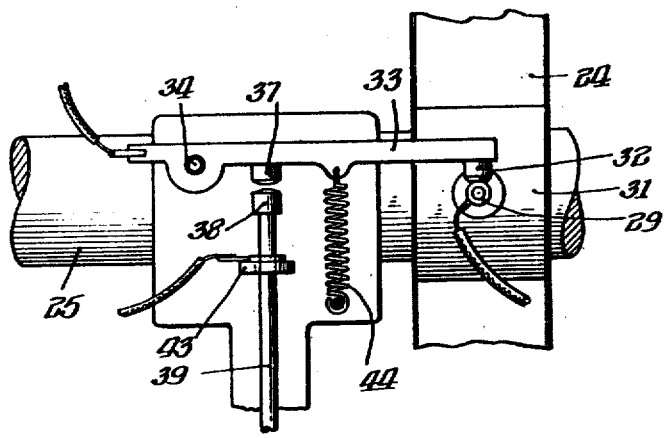
Figure 3 is a broken-away plan view, on a larger scale, of one of the contact mechanisms shown in Figure 1.

Referring to Figures 1, 4 and 5, it will be noted that a cam 52, balanced in any appropriate manner so as to have no effect on the unbalanced body undergoing test, is attached to one end of shaft 25 so that it rotates with the body, such cam coacting with a rock-arm 53 through a contact 54 on the arm riding on the cam periphery, such arm being hinged or fulcrumed at 55 on an insulation-pin on a disc 56 from which the arm is thus electrically insulated.

A coiled contractile spring 57 fastened at one end to arm 53 and at its opposite end to an insulation stud on disc 56 tends to pull the lug or contact 54 into engagement with the cam-surface.

A contact-screw 58 adjustable lengthwise in a threaded hole through a bracket 59 on and insulated from the disc and provided with a lock-nut 61 coacts with a contact 62 on the rock-arm.

Disc 56 is fixedly mounted on the end portion of an inner short shaft 63 (Figure 4) turnable in a bearing 64 in the upper end portion of an upstanding bracket 65 (Figure 2) on the bearing-member 24, so that the disc vibrates with shaft 25 and body 26, such bearing 64 having a spring friction-device 66 (Figure 4) to yieldingly maintain shaft 63 in any position of angular adjustment.

The end of shaft 63 opposite the disc is joined through two universal-joints 67, 67 and intermediate connection with an outer shorter shaft 68 turnable in a bearing 69 at the end of a horizontal bracket 71 (Figures 1 and 2) mounted on one of the stationary standards 22, the terminal portion of the shaft having a knurled knob 72 by means of which the shaft and its associated members may be turned to secure any desired angular adjustment of the disc 56 and the contacts which it carries.

By adjustment of screw-contact 58, a position thereof can be ascertained whereby closure between the contacts 58 and 62 will be retained for 180° of rotation of the shaft 25 and cam 52 and such closure broken for the remaining 180° of rotation of such shaft and cam, and this adjusted position of the screw-contact may be maintained by tightening the lock-nut 61 on the screw by its engagement with the member 59.

The parts are so designed and arranged that, when switch 58—62 is thus closed for 180° of rotation of the shaft and body, the electrical engagement between contact 54 and the metallic or conductive cam 52 will be maintained for the other or remaining 180° of such rotation, it being obvious that, when contact 62 in its backward and forward rocking movement, brought about by the rotation of the cam, engages its companion contact 58, the arm can no longer swing inwardly under the action of spring 57, with the result that contact 54 thereafter is out of contact with the cam until the latter, during its continued turning with the shaft and body, again engages it and simultaneously opens switch 58—62 and closes switch 52—54.

From the foregoing, it should be clear that the two switches 58—62 and 52—54 have alternate closure periods, which, by adjustment of contact 58, can be made equal, each being for 180°.

Figure 7 depicts an electric-circuit means which may be used for determining when the cam-actuated contacts 58—62 have been arranged or positioned to dwell closed for such 180° and to remain open for the like number of degrees of rotation.

As shown in such figure, one terminal of the galvanometer 70 is joined by a wire 73 to the screw-contact 58 through its support 59, the companion terminal of the galvanometer being connected to ground by a conductor 74 fitted with a switch 75, an intermediate point of the resistance 76, bridging the instrument 70, being united with the conductive rock-arm 53 and its two contacts 54 and 62 by a wire 77 which includes a battery 78 or other source of electric-current, the cam 52 and its shaft 25 being grounded at 79.

The determination when 180° switch-closure and 180° switch-open periods have been secured by adjustment of contact 58 is ascertained by this circuit of Figure 7 in substantially the same manner as the system employed in Figure 6 in determining the center-point of oscillation or vibration.

In each instance, by reason of the rapid opening and closing of the two switches in alternation, the needle of the electrical-instrument 45 or 70, as the case may be, tends to oscillate in opposite directions from its central zero or neutral position, but, since these opposing impulses are so rapid, the needle cannot respond, and, if these antagonizing or counteracting impulses are of equal strength, the needle remains immovable at its zero or midway position indicative of the attainment of such equality of the two forces involved.

In Figure 8 there has been illustrated a complete or consolidated electric-circuit system incorporating all four electric-switches, that is the two switches used for determination of the centerpoint of vibration-amplitude and the pair of cam-operated switches employed to ascertain the angular position of such centerpoint.

This system comprises a galvanometer or comparable electrically-operated instrument 83 bridged by a resistance 84 an adjustable-intermediate point of which is connected by a wire 85, including a battery 86, to the movable arm of a switch 81, contact 1 of which is joined to arm 33 by a wire 87, contact 2 of which is united with arm 53 by connection 88, a switch 3 being joined to both wires 87 and 88.

Wire 89 connects one end of the resistance 84 and the corresponding terminal of the galvanometer 83 to the adjustable switch contact 38, whereas the opposite end of the resistance and the companion terminal of the galvanometer are joined by a conductor 91 to the movable contact of a two-point switch 82, whose contact 1 is coupled by wire 92 with the oscillatory contact and whose other contact 2 is connected by wire 93 to the adjustable contact 58.

In addition, the system may be grounded through wire 74 and switch 75 and the shaft and cam are grounded at 79.

When the switch-arms of the two switches 81 and 82 engage their contacts 1, 1, the center-point of vibration-amplitude may be found in the manner hereinabove indicated in connection with Figure 6, and, when such two switch-arms are shifted to touch their contacts 2, 2, and switch 75 is closed, then the cam-operated switches function as described in connection with Figure 7.

Assuming that the adjustments of both movable contacts 38 and 58 have been made so that, in each instance, the galvanometer gives a zero or mid-point reading as presented above, it will be obvious that by exchanging or substituting one set of cam-operated contacts for one set of the contacts operated by the oscillation, the former set will remain closed and operative for 180° of revolution and the latter set will be closed and active for 180° of rotation and oscillation, and then by angular adjustment of the cam-operated single pair of contacts, the phase relationship of the two 180° closures may be made exactly opposite one another at which time only the galvanometer-needle will give a zero reading showing such condition to exist.

The foregoing procedure may be accomplished by causing the switch-arm of switch 81 to engage its contact 1 or 2 and closing switch 3 which, as illustrated, is in direct connection through the wiring shown with both rock-arms 33 and 53 and, by having the switch-arm of switch 82 touch its contact 2 and with switch 75 open, such connections cut out the switch 29—32 and substitute therefor the cam-operated switch 58—62.

Then, by turning disc 56 by knob 72 and switch 58—62 mounted on the disc, the closing and opening of such switch relative to the rotation of the cam can be altered to bring its 180° period of closure the exact opposite of the 180° period of closure of the switch 37—38, and when this is evidenced by the zero reading of the needle of the galvanometer, the power rotation of shaft 25, together with its body 26 and cam 52 is terminated, the adjusted position of the disc and its associated elements being maintained by the friction-device 66, and such shaft and its associated parts are then turned by hand in the same direction only so far as when the cam initiates the closure of switch 58—62, whereupon such manual revolution of the shaft is stopped.

Then the mark 84 is made on the body 26 in register with the end of the pointer 83 carried by the bearing-member directly above the axis of shaft 25.

Such single mark correctly represents one of the two center-points of vibration-amplitude and also the angular position thereof relative to the shaft, it being obvious that the other center-point of vibration movement, while the unbalanced body is traveling in the opposite direction, is located 180° from such mark 84.

With this data available, and with further information which may be obtained by trial, the proper correctional weight may be ascertained for application to the body at the right point to overcome its unbalance.

If desired, the hand-rotation of the shaft and body may be continued until switch 58—62 opens as indicated by the galvanometer which is the point 180° from the point of contact making, and, therefore, either center-point of vibration-amplitude may be indicated, it being borne in mind that the oscillating switch contacts close at the center of oscillation once when the oscillation is in one direction and again at the center when the oscillation is in the opposite direction.

Either center may be indicated, depending upon which one is desired.

The foregoing discloses the fundamental system or method of the present invention and an appropriate means to indicate a point on a rotatable member, such point being the mid-way point or center of oscillation transferred to the identical position in rotation.

We claim:

1. In an indicating-system for use with a balance-testing machine in which the body undergoing balance-examination is rotated about its axis and is mounted with freedom for transverse vibration in at least one plane, the novel combination of a first electric-switch actuated by the vibration of said rotating vibrating body, a second electric-switch actuated by the rotation of said rotating vibrating body, means to cause said first switch to close at one of the center-points of vibration-amplitude of said body, remain closed for 180° and then open at the other center-point of vibration-amplitude of said body, means to cause said second switch to remain closed 180° of the rotation of said body, means to adjust said 180° closure period of said second switch around the axis of said body, and electric-circuit and indicating means to show when the 180° closure periods of said two switches are exactly opposed to one another and unitedly constitute the 360° of rotation.

2. In an electric-indicating system, for use with a balance-testing machine in which the body undergoing balance-examination is rotated about its axis and is mounted with freedom for transverse vibration in at least one plane, the novel combination of (a) means to determine when the rotating vibrating body passes through the center-point of vibration-amplitude including a pair of electric-switches, means, actuated by the vibration of said body producing alternating closure periods of the two switches, and means to adjust the periods of closure of said two switches to produce their 180° of rotation equalization, and (b) means to determine the angular-position of said body when passing through said center-point including a third electric-switch, means actuated by the rotation of said body producing alternating 180° of rotation closure and open periods of said third switch, and means to adjust the period of closure of said third switch angularly about the axis of said body, (c) electrically-actuated indicating-means, (d) electric-circuit connections adapted to be supplied with electric-current and (e) switch-means permitting (1) coupling of said first pair of switches with said indicating-means to determine when said equalization has been effected, and (2) permitting the coupling of one switch of said first pair and said adjustable third switch with said indicating-means to determine when their 180° periods of closure are directly opposed to one another.

IRA A. WEAVER.
CLYDE H. PHELPS.